United States Patent [19]

Bohman

[11] Patent Number: 4,883,964
[45] Date of Patent: Nov. 28, 1989

[54] OPTICAL METHOD AND APPARATUS FOR DISCRIMINATING BETWEEN CROP STALKS AND WEED STALKS IN A NON-CONTACT ROW CROP HARVESTER GUIDANCE SYSTEM

[75] Inventor: Carl E. Bohman, New Holland, Pa.

[73] Assignee: Ford New Holland, Inc., New Holland, Pa.

[21] Appl. No.: 288,359

[22] Filed: Dec. 22, 1988

[51] Int. Cl.⁴ ...................... A01D 75/00; G01N 21/59
[52] U.S. Cl. .................................. 250/341; 250/349; 56/10.2
[58] Field of Search ........................ 56/10.2, DIG. 15; 250/341, 349, 239, 215; 340/901

[56] References Cited

U.S. PATENT DOCUMENTS 3,583,514 6/1971 Taylor ................................. 56/10.2
4,077,488 3/1978 Bennett, Jr. et al. ................ 56/10.2
4,528,804 7/1985 Williams .............................. 56/10.2

FOREIGN PATENT DOCUMENTS 2455836 12/1976 Fed. Rep. of Germany ....... 56/10.2

Primary Examiner—Carolyn E. Fields
Attorney, Agent, or Firm—Griffin, Branigan & Butler

[57] ABSTRACT

A row crop harvesting machine is provided with first and second infra-red transmitters and first and second infra-red receptors for sensing the infra-red beams emitted by the transmitters. The transmitters and receptors and mounted on two adjacent crop row separators of a harvesting machine header and are positioned such that the beams intersect in a region which defines the alignment of the harvesting machine relative to a row of crop stalks. The widths of the beams are chosen to be less than the width of the crop stalks being harvested but greater than the width of weed stalks which may be growing in the region of a crop row.

6 Claims, 1 Drawing Sheet

OPTICAL METHOD AND APPARATUS FOR DISCRIMINATING BETWEEN CROP STALKS AND WEED STALKS IN A NON-CONTACT ROW CROP HARVESTER GUIDANCE SYSTEM

RELATED APPLICATIONS

This application is related to my concurrently filed applications U.S. Ser. No. 288,598 entitled Non-Contact Sensing Unit For Harvester Guidance System, and U.S. Ser. No. 288,360 entitled Method and Apparatus for Discriminating Between Crop Stalks and Weed Stalks in a Non-Contact Row Crop Harvester Guidance System the disclosures of which is incorporated herein by reference.

BACKGROUND OF THE INVENTION

My concurrently filed application U.S. Ser. No. 288,598 entitled Non-Contact Sensing Unit For Row Crop Harvester Guidance System discloses a guidance system for detecting the location of a harvesting machine relative to the stalks of a crop row and producing output signals for automatically steering the harvesting machine or producing steering control indications for visually indicating to an operator how he should steer the harvesting machine in order to keep or bring the harvesting machine into alignment with a row of crop stalks. The guidance system includes first and second energy beam transmitters and first and second receptors for receiving the energy beams transmitted by the transmitters. The transmitters and receptors are positioned on two adjacent crop row separators of the header which is mounted on the harvesting machine ahead of its cutting mechanism. The transmitters and receptors are mounted such that the energy beams emitted by the two transmitters intersect in a region midway between the crop row separators whereby, if the two beams are interrupted substantially simultaneously by a crop stalk, the harvesting machine is aligned with the crop row. If one beam is intercepted before the other it is an indication that the harvesting machine is not aligned with the crop row. A time comparison circuit is responsive to output signals from the beam receptors to produce steering control signals indicating how the harvesting machine must be steered in order to bring it into alignment with the row of crop stalks.

As explained in the application U.S. Ser. No. 288,598 the lower leaves of some stalk crops pass through the energy beams. Where two transmitters transmit intersecting energy beams to two receptors these leaves cause false indications of stalks, and cause the guidance system to fail to sense some stalks. To overcome this problem the related application discloses that plural transmitter/receptor pairs may be provided with the two beams of each transmitter/receptor pair intersecting in a region midway between two dividers and the points of intersection of the two transmitter/receptor pairs lying in a straight line extending vertically midway between the two dividers.

U.S. application Ser. No. 288,360 discloses an alternative method and apparatus for discriminating between leaves and crop stalks. As disclosed therein, the beams transmitted by the transmitters are infra-red energy beams of sufficient intensity, and the receptors are infra-red energy sensors have a desired degree of sensitivity, the stalks intercept the beams but the beams "burn through", that is, they are sensed by the receptors through the leaves. This permits a single transmitter/receptor pair to distinguish between leaves and crop stalks.

U.S. application Ser. No. 288,598 also discloses an electronic method and apparatus for discriminating between crop stalks and weed stalks based on the length of time the energy beams are interrupted by crop stalks as compared to the length of time the beams are interrupted by weed stalks which are usually smaller than the smallest crop stalk. As explained in the application, the electronic discriminator is in part dependent on the ground speed of the harvesting machine. The present invention provides an optical method and apparatus for discriminating between crop stalks and weed stalks, completely independent of the ground speed of the harvesting machine.

SUMMARY OF THE INVENTION

An object of the present invention is to provide an optical method and apparatus for discriminating between crop stalks and weed stalks in a non-contact row crop sensing system.

An object of the invention is to provide a method and apparatus which is independent of ground speed for discriminating between weed stalks and crop stalks along a row being harvested.

An object of the present invention is to provide a method of discriminating between crop stalks and weed stalks by generating two energy beams having widths less than the width of crop stalks being harvested but greater than the width of weed stalks in the region of a crop row.

An object of the invention is to provide a guidance system for a row crop harvesting machine, the system having transmitters for producing infra-red energy beams of a width less than the width of crop stalks but greater than the width of weed stalks.

Other objects of the invention and its mode of operation will become apparent upon consideration of the following description and the accompanying drawings.

DETAILED DESCRIPTION OF THE INVENTION

Figure 1:
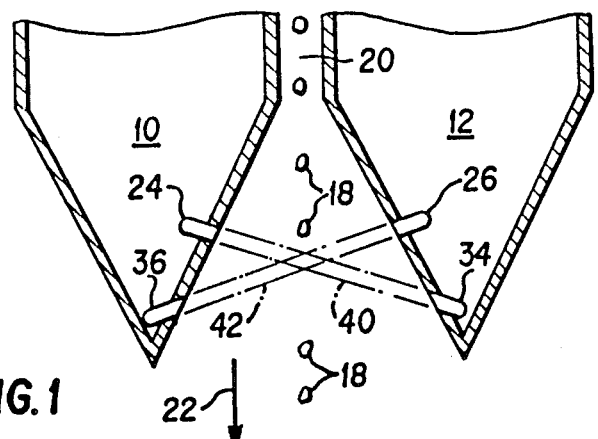
FIG. 1 is a top, part sectional view of a harvesting machine header showing two row crop row separators having a single transmitter/receptor pair mounted thereon.
Figure 2:
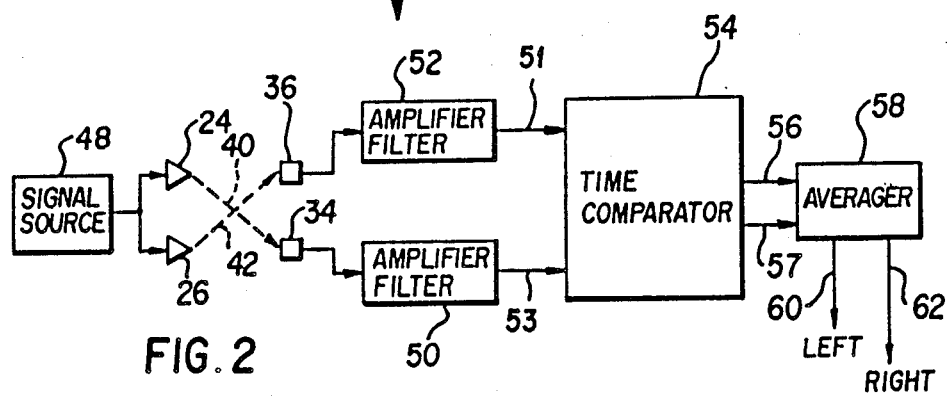
FIG. 2 is a circuit diagram of a non-contact row crop harvesting machine guidance system and, FIGS. 3A–3C are schematic top sectional views of a transmitter, receptor and lens system.

FIGS. 1 and 2 illustrate a harvesting machine guidance system as described in detail in related U.S. application Ser. No. 288,598 entitled Non-Contact Sensing Unit For Row Crop Harvester Guidance System, the disclosure of which is incorporated herein by reference. Briefly, two energy beam transmitters 24 and 26 and two energy beam receptors 34 and 36 are mounted on two adjacent crop row separators 10, 12 of a header which is carried on the front of a row crop harvesting machine. The harvesting machine (not shown) may be a combine, a pull-type or self-propelled harvester, or any conventional row crop harvester. The row separators 10 and 12 are provided with holes and the transmitters and receptors are mounted on the row separators so that energy beams 40 and 42, transmitted by transmitters 24 and 26, respectively, are received by receptors 34 and 36, respectively.

The two energy beams intersect midway between the crop row separators 10 and 12, so if the harvesting machine is aligned with a row of stalks 18 each stalk will block or interrupt energy beams 40 and 42 at substantially at the same time as the harvesting machine moves in the direction of arrow 22. On the other hand, if the harvesting machine is too far to the right or left (looking in the direction of arrow 22) then one energy beam 40 or 42 will be interrupted before the other one is interrupted.

As shown in FIG. 2, the energy beam transmitters 24 and 26 are energized by a signal source 48. The output signals produced by energy beam receptors 34 and 36 are applied through amplifier and filter circuits 50 and 52, respectively, to a time comparator 54. The time comparator determines the relative time sequence in which the energy beams 40 and 42 are blocked by crop stalks as the harvesting machine moves along a crop row. The time comparator 54 produces output signals which are applied to an averaging and threshold circuit 58 which is fully described with reference to FIG. 3 of the application. The averaging circuit produces two steering control signals on output leads 60 and 62 which may be applied to the steering control mechanism for automatic guidance of the harvesting machine, or may be applied to indicators to indicate to an operator how he should steer the harvesting machine to keep it in alignment with the row of crop stalks 18.

The application also describes, with reference to FIGS. 6 and 7 thereof, apparatus for discriminating between energy beam intercepts caused by crop stalks and those caused by weed stalks, the discrimination being based on the interval of time an energy beam intercepted. Each energy beam receptor drives a one-shot multivibrator and an AND with the output of the multivibrator controlling the AND. The arrangement is such that the AND produces an output signal only if the drive signal from the receptor is longer than the timing interval of the multivibrator, which will be the case if the intercept is caused by a crop stalk.

U.S. application Ser. No. 288,360 discloses the use of infra-red energy beam transmitters which transmit to the receptors infra-red energy beams of sufficient intensity that they may be sensed by the receptors through leaves but not through crop stalks. The transmitters and receptors may be type SM31EL emitters and type SM31RL receptors commercially available from Banner Engineering Corporation and described in the product bulletin entitled MINI-BEAM SM31EL/RL Self-Contained DC Opposed Mode Sensor Pair. The transmitters produce an effective beam size of about 3/8".

Figure 3A:
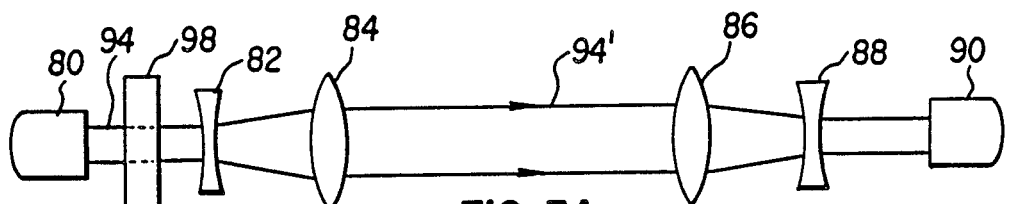

According to a preferred embodiment of the present invention, the energy beam transmitters 24 and 26 are infra-red energy beam transmitters and an optical system is provided between each transmitter 24, 26 and its receptor 34, 36 for the purpose of broadening the infra-red energy beam. As illustrated in FIG. 3A, the optical system comprises a diverging lens 82 for broadening the infra-red energy beam produced by a transmitter 80 and directing it into a lens 84 which then directs the rays of the broadened beam 94' in parallel toward a receptor 90. A converging lens 86 converges the broadened beam rays and directs them toward a lens 88. Lens 88 directs the rays of the beam in parallel toward receptor 84.

Figure 3B:
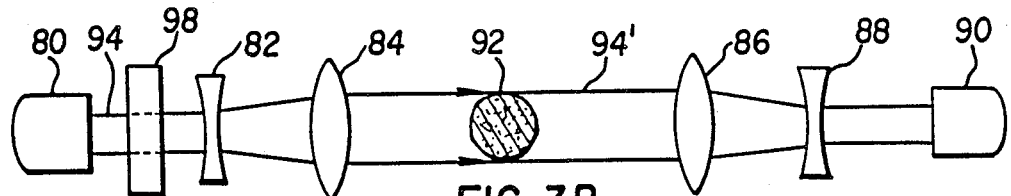

FIG. 3B shows that a crop stalk 92 which has a width at least as wide as the broadened beam 94' completely blocks the beam. When the beam 94' is completely blocked receptor 90 produces an output signal indicating that a crop stalk has been detected. As used in this specification and the appended claims, the term width refers to the dimension generally parallel to the ground.

Figure 3C:
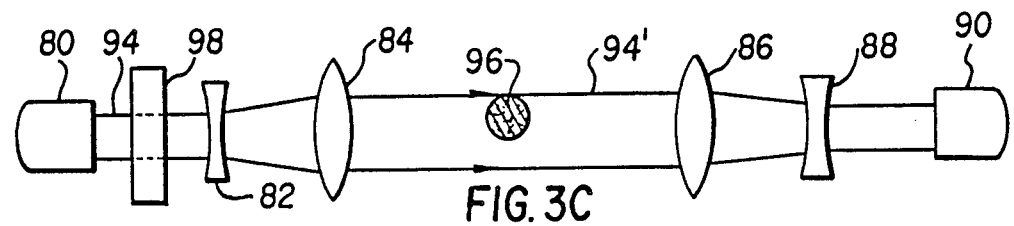

Weed stalks are generally smaller than crop stalks. FIG. 3C shows a weed stalk 96 less than the width of widened beam 94'. From FIG. 3C it is evident that as the optical system moves along the crop row so that stalk 96 intercepts beam 94', the beam is never completely blocked by the stalk. Therefore, receptor 90 does not produce an output signal as the beam moves across the stalk.

An adjustable aperture stop 98, which may be an adjustable diaphragm or other conventional aperture stop, may be provided so that the width of the beam 94' may be varied. This permits adjustment of the beam width according to the width of the crop stalks being harvested. The width of the beam is preferably adjusted so that it is slightly narrower than the smallest crop stalks. This permits maximum discrimination of weed stalks and at the same time causes a minimum reduction in the ability of the beam to "burn through" leaves, as discussed in co-pending U.S. application Ser. No. 288,360.

While a specific preferred embodiment of the invention has been described herein, it will be understood that various modifications and substitutions may be made in the described embodiment without departing from the spirit and scope of the invention as defined in the appended claims. For example, visible light transmitters and receptors may be used in place of infra-red devices.

The embodiments of the invention in which an exclusive property or privilege is claimed are defined as follows.

1. In a guidance system for a row crop harvesting machine operable to move along a row of crop stalks which may contain weed stalks of less width than the width of the crop stalks, a method of discriminating between crop stalks and weed stalks, said method comprising:
producing, at one side of a crop row, first and second energy beams of a given width and which cross a crop row and intersect at a crop row when the harvesting machine is aligned with the crop row, said given width being less than the width of crop stalks but greater than the width of weed stalks; and,
detecting said first and second energy beams at the other side of said crop row to determine when either of said energy beams is blocked.

2. The method as claimed in claim 1 wherein the step of producing first and second energy beams comprises producing first and second infra-red beams.

3. In a guidance system for a row crop harvesting machine operable to move along a row of crop stalks which may contain weed stalks of less width than the width of the crop stalks, apparatus for discriminating between crop stalks and weed stalks comprising:
first and second energy beam transmitter means mounted on the harvesting machine for moving along one side of a crop row, said first and second energy beam transmitter means producing first and second energy beams of a given width and which cross a crop row and intersect at a crop row when the harvesting machine is aligned with the crop row, said given width being less than the width of crop stalks but greater than the width of weed stalks; and, first and second energy beam receptor means mounted on said harvesting machine for moving along the other side of said crop row for detecting when either of said energy beams is blocked.

4. Apparatus as claimed in claim 3 wherein said first and second energy beam transmitter means are infra-red energy beam transmitters.

5. A guidance system for a row crop harvesting machine operable to move along a row of crop stalks which may contain weed stalks of less width than the width of the crop stalks, said system including apparatus for discriminating between crop stalks and weed stalks, said system comprising:

first and second energy beam transmitter means mounted on the harvesting machine for moving along one side of a crop row, said first and second energy beam transmitter means producing first and second energy beams of a given width and which cross a crop row and intersect et a crop row when the harvesting machine is aligned with the crop row, said given width being less than the width of crop stalks but greater than the width of weed stalks;

first and second energy beam receptor means mounted on said harvesting machine for moving along the other side of said crop row for producing an output signal when said first or said second energy beam, respectively, is blocked; and, time comparator means responsive to the output signals produced by said first and second receptor means for determining the relative time of intercept of said first and second energy beams and producing steering control signals for guiding said harvesting machine along the row of crop stalks.

6. A guidance system as claimed in claim 5 wherein said first and second energy beam transmitter means are infra-red energy beam transmitters.

* * * * *